US007011713B2

(12) United States Patent
Fann et al.

(10) Patent No.: US 7,011,713 B2
(45) Date of Patent: Mar. 14, 2006

(54) CASCADE EXTRACTING AND SOLVENT REFRESHING METHOD FOR RECYCLING JELLY CABLES

(75) Inventors: Daw-Ming Fann, Taoyuan (TW); Shiow-Chen Lu, Taoyuan (TW); Yih-Chyuan Lin, Taoyuan (TW); Jih-Yang Liu, Taoyuan (TW); Hsi-Pai Hsu, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 167 days.

(21) Appl. No.: 10/767,440

(22) Filed: Jan. 30, 2004

(65) Prior Publication Data

US 2005/0166944 A1   Aug. 4, 2005

(51) Int. Cl.
 *C23G 1/36* (2006.01)
(52) U.S. Cl. .............................. 134/10; 134/2; 134/11; 134/12; 134/19; 134/39; 134/40; 134/42
(58) Field of Classification Search .................... 134/2, 134/10, 11, 12, 19, 42, 39, 40
See application file for complete search history.

(56) References Cited

U.S. PATENT DOCUMENTS

| 3,933,674 A | * | 1/1976 | Farnsworth ................. 510/242 |
| 4,173,493 A | * | 11/1979 | Kallas .......................... 75/715 |
| 4,332,677 A | * | 6/1982 | Budzich et al. ................ 209/3 |
| 4,363,449 A | * | 12/1982 | Carr et al. ..................... 241/20 |
| 5,526,833 A | * | 6/1996 | Crespel et al. ........... 134/102.1 |
| 6,152,149 A | * | 11/2000 | Miller et al. .................... 134/6 |
| 6,607,608 B1 | * | 8/2003 | Vetrano et al. ............... 134/19 |
| 2005/0166944 A1 | * | 8/2005 | Fann et al. ................... 134/10 |

FOREIGN PATENT DOCUMENTS

| TW | 414731 | 12/2000 |
| WO | WO92/18991 | * 10/1992 |

* cited by examiner

*Primary Examiner*—Sharidan Carrillo
(74) *Attorney, Agent, or Firm*—Rabin & Berdo, P.C.

(57) ABSTRACT

The method of continuously collecting jelly compounds from jelly filled cable is performed by recycling operation of a solvent by repeatedly heating, cleaning and condensing the recycling solvent used to deprive the jelly compounds of the jelly filled cable. The solvent can be retrieved for reuse unlimited times, and the collected jelly compounds can be purified for reuse too. The method is energy saving with less consumption of solvent. Absolutely no worry of an additional public nuisance.

7 Claims, 1 Drawing Sheet

CASCADE EXTRACTING AND SOLVENT REFRESHING METHOD FOR RECYCLING JELLY CABLES

BACKGROUND OF THE INVENTION

1. Field of the Invention

The present invention relates to method of continuously collecting jelly compounds from jelly filled cable by recycling operation of solvent, and more particularly, to method of collecting jelly compounds from jelly filled cable by repeatedly heating, cleaning and condensing the recycling solvent used to dissolve the jelly compounds and jelly filled contained in the refuse cable so as to achieve the aims of saving the consumption of solvent and the heat energy as well.

2. Description of the Prior Art

In the method of collecting jelly contained in the jelly filled cable disclosed in Taiwan Pat. No. 414731 (called cited case hereinafter), the operation is carried out at room temperature, operating time is above 3 minutes, the solvent used for deoiling can not be repeatedly operated for more than 5 times, the used solvent can not be perfectly cleaned for reuse, and the jelly compounds cleaned out of the jelly filled cable are mixed with the solvent to form a harmful slurry resulting in second time public nuisance.

With the above mentioned shortcoming, the method provided by the cited case is by no means a perfect one, and some improvements are necessary.

Aiming at the above depicted situation, the present invention is to propose a newly developed method that is able to continuously collecting jelly compounds from jelly filled cable by recycling operation of solvent which is the result of the present inventor's intensive research based on many years of experimentation and improvement and now will be disclosed hereinafter.

SUMMARY OF THE INVENTION

Accordingly, it is an object of the present invention to provide a method of collecting jelly compounds from jelly filled cable wherein by heating the solvent to increase the solubility of the jelly compounds so as to easily deprive the jelly compounds from of the jelly filled cable.

It is another object of the present invention to provide a method of collecting jelly compounds from jelly filled cable wherein the purified solvent can be retrieved in the vaporized form every time it has performed one round of collecting jelly compounds from the jelly filled cable so that it can be re-used as a new one.

It is still another object of the present invention to provide a method of collecting jelly compounds from jelly filled cable wherein the vaporized solvent during the operation never be dissipated to causes additional public nuisance.

It is a further object of the present invention to provide a method of collecting jelly compounds from jelly filled cable wherein the collected jelly compounds can be separated from the solvent by the step of distillation and concentration for reuse.

To achieve these and other object mentioned above, the method of the present invention essentially comprises the steps of heating and condensing the solvent to prepare a purified solvent for cleaning the jelly filled cable; resolving the jelly compounds contained in the jelly filled cable by boiling solvent; and evaporating and condensing the mixture of the solvent and the jelly compounds to separate and collect them respectively for reuse.

For fully understanding of the nature and objects of the invention, reference should be made to the following detailed description taken in conjunction with the accompanying drawing.

DETAILED DESCRIPTION OF THE PREFERRED EMBODIMENT

Figure 1:
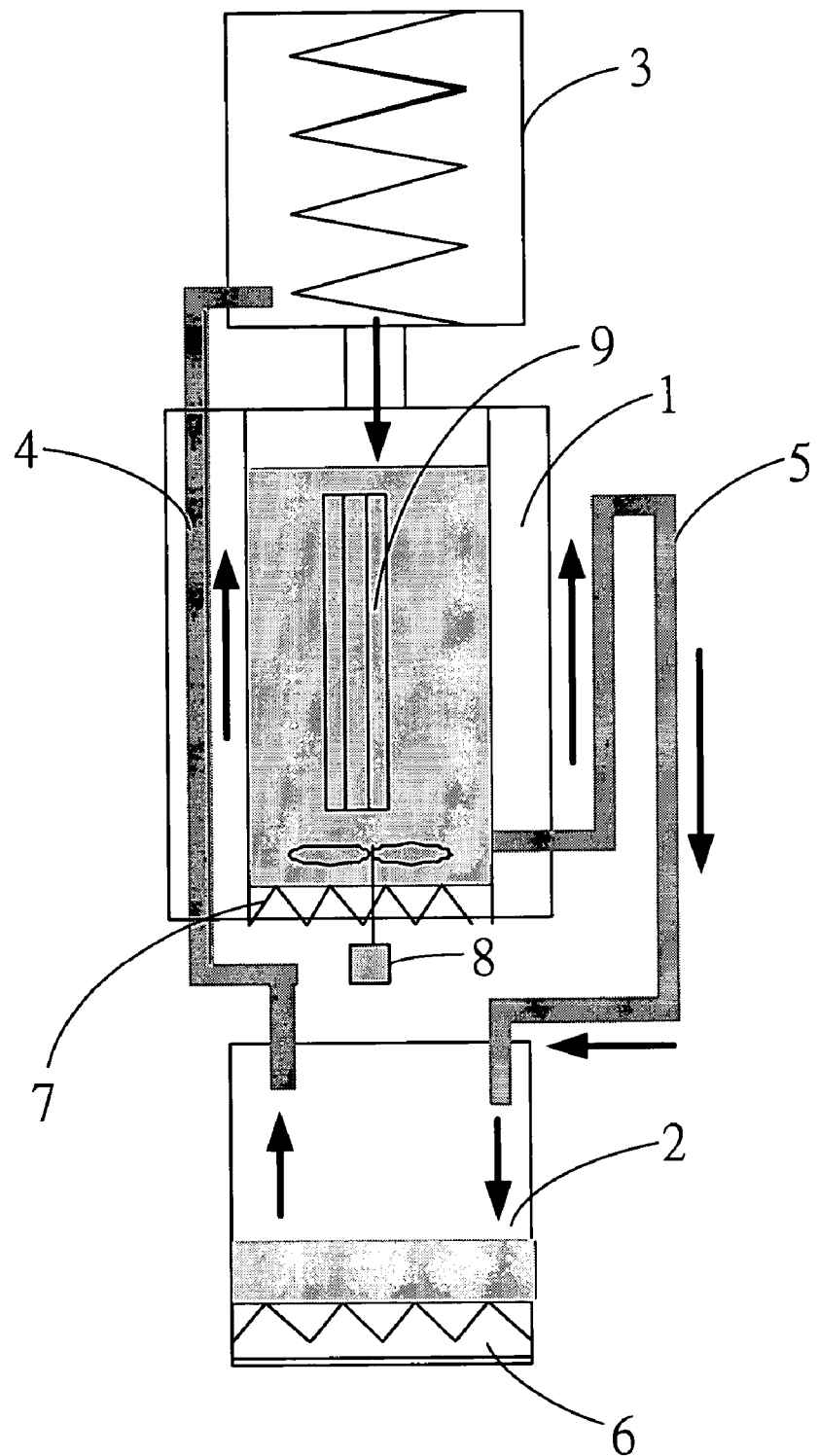
FIG. 1 is a schematic view of the equipment for performing method of the present invention.

Tables I and II show the composition of a representative jelly filled cable, and the composition of the filled materials contained in the same cable respectively.

TABLE I

| Composition | (w/w %) | |
|---|---|---|
| | Cable A | Cable B |
| Wrapping paper, plastic tape | 2.8 | 0.7 |
| Wrapping paper | 0 | 1.3 |
| PE insulation | 5.6 | 5.4 |
| Copper conductor | 42.3 | 52.0 |
| Jelly compounds | 10.5 | 9.7 |
| Black PE sheath | 28.0 | 21.8 |
| Laminated Al sheath | 10.8 | 9.1 |

TABLE II

| Jelly filled cable | Type of jelly compounds | MSDS data | Major components |
|---|---|---|---|
| A | petroleum jelly | poly butane 70%, mineral oil 15% polyethylene 14%, antioxidant 1% | poly butane, mineral oil |
| B | petrolatum | base oil, petroleum derived, microcrystalline waxes, and non hazardous polymers. | petroleum, waxes, mineral oil |

FIG. 1 is a schematic view of the equipment for performing method of the present invention, the equipment includes; a cleaning tank 1, an evaporation and concentration tank 2, a condenser 3, a vapor pipe 4, a liquid transportation pipe 5, a first heater 6, a second heater 7, and an agitator 8, and the method comprises the following steps:

1. Tell jelly filled cable was cut apart and the outer sheath removed, putting the jelly filled cable core 9 in a perforated basket, and then setting the basket in the cleaning tank 1.

2. Transferring the solvent into the evaporation and concentration tank 2 and heating the solvent with the first heater 6 until the solvent boils, and conducting the vaporized solvent into the condenser 3 via the vapor pipe 4 so as to perform heat exchange between the vapor pipe 4 and the cleaning tank 1 thereby heating up the cleaning tank 1. The solvent may be a aliphatic organic solvent.

3. Condensing the vaporized solvent with the condenser, and then conducting the condensed solvent into the cleaning tank 1.

4. Immersing the jelly filled cable core 9 in the solvent having the liquid/solid ratio of 2/1 (v/w), heating the cleaning tank 1 with the vapor pipe 4 preferable at a operating temperature from the room temperature up to the solvent boiling point employing the second heater 7 as an auxiliary means for temperature control, and agitating the solvent with the agitator 8 at 20 rpm so as to dissolve the jelly compounds. The cleaning time shall be maintained at least 3 minutes after the jelly filled cable 9 has been completely immersed in the solvent. Afterwards discharging the solution containing the jelly compounds into the evaporation and concentration tank 2 via the liquid transportation pipe 5. If the slurry contained in the evaporation and concentration tank 2 exceeds 50% of the solution, the solution should be transferred to a separate evaporator means for separation by concentration so to retrieve the solvent for reuse and jelly compound was recovered.

5. Heating the evaporation and concentrallion tank 2 so as to concentrate and accumulate the deprived jelly compounds in the evaporation and concentration tank 2. The vaporized solvent is returned to the cleaning tank 1 after being condensed for reuse.

6. Repeating the step 2 to step 5 so as to continuously collect jelly compounds from jelly filled cable by recycling operation of solvent.

In this version, the method of the present invention is able to deprive jelly compounds of the jelly filled cable by repeatedly heating, cleaning and condensing the recycling solvent used to dissolve the jelly compounds contained in the jelly filled cable with minimum consumption of the solvent and heat energy as well.

The chemical structure and the physical properties of the recycling solvent employed by the present invention is listed in Table III, and the relation of recycling time of the solvent versus percentage amount of collection is shown in Table IV.

TABLE III

|  | chemical structure | Boiling point | Flash point |
|---|---|---|---|
| n-hexane | $C_6H_{14}$ | 69° C. | −22° C. |
| n-heptane | $C_7H_{16}$ | 98.4° C. | −4° C. |

TABLE IV

| Recycling solvent |  | n-heptane | n-hexane |
|---|---|---|---|
| Cable A | first cycle | 97.4 | 96.3 |
|  | second cycle | 2.1 | 2.8 |
|  | third cycle | 0.5 | 0.9 |
| Cable B | first cycle | 96.0 | 94.5 |
|  | second cycle | 2.9 | 4.5 |
|  | third cycle | 1.1 | 1.0 |

It emerges from the description of the above example that the invention has several noteworthy advantages over the prior art, in particular:

1. The combination process of heated dissolving, solvent vapor condensing and evaporating concentration that employed by the present invention result in performing the operation effectively with less solvent and energy consumption.

2. The efficiency of jelly extraction was enhanced and accelerated by repeated flushing of refreshed solvent in an elevated temperature environment.

3. That the aims of purifying the recycling solvent and separating the concentrated collecting objects are efficiently achieved by solvent distillation and separation process.

4. That the disadvantage of producing large amount of slurry after cleaning process which might lead to an extra public nuisance inherent to the conventional technique can be surely avoided.

The comparison of the present invention with the cited case (Taiwan Pat No. 414731) is enumerated in Table V

|  | Cited case | The present invention |
|---|---|---|
| Operation temp for collection | Room temp. | Solvent boiling point nearly reaches the critical temp for improving solubility |
| Cleaning times | Once | Several times(can be predetermined) |
| Possible recycling times for solvent | Less than 5 times | Unlimited |
| Retrieving of solvent | Impossible | Can be retrieved for reuse |
| Jelly compounds collection | impossible | Collection for reuse is surely possible by concentrating to separate. |

Many changes and modifications in the above described embodiment of the invention can, of course, be carried out without departing from the scope thereof. Accordingly, to promote the progress in science and the useful art, the invention is disclosed and is intended to be limited only by the scope of the appended claims.

What is claimed is:

1. A method of continuously removing jelly compounds from a jelly filled cable by recycling a solvent, comprising the steps:

putting a jelly filled cable core in a perforated basket, and then setting said basket in a cleaning tank;

transferring a solvent into an evaporation and concentration tank and heating said solvent with a first heater until said solvent boils and vaporizes, and transporting the vaporized solvent into a condenser via a vapor pipe so as to perform heat exchange between said vapor pipe and said cleaning tank, thereby heating said cleaning tank;

condensing said vaporized solvent in said condenser and then transporting said condensed solvent from said condenser into said cleaning tank;

removing said jelly compounds from the jelly filled cable by immersing said jelly filled cable in said solvent, heating said cleaning tank with said vapor pipe and maintaining the temperature of the solvent at the solvent boiling point in the cleaning tank by employing a second heater as an auxiliary means for temperature control, and agitating said solvent in said cleaning tank with an agitator so as to dissolve the jelly compounds, the operating time being maintained at least 3 minutes after said jelly filled cable has been completely immersed in said solvent, and afterwards discharging a solution containing the jelly compounds into said evaporation and concentration tank via a liquid transportation pipe;

heating said evaporation and concentration tank so as to concentrate and accumulate the jelly compounds in said evaporation and concentration tank and vaporize said solvent, said vaporized solvent being returned to said cleaning tank after being condensed for reuse; and repeating the steps so as to continuously remove jelly compounds from the jelly filled cable by recycling the solvent.

2. The method as in claim 1, wherein said jelly compounds are purified in said evaporation and concentration tank for reuse.

3. The method as in claim 1, wherein said cleaning tank is heated up by heat exchange performed by the evaporation heat of said solvent in said vapor pipe and said cleaning tank.

4. The method as in claim 1, wherein said solvent is a aliphatic organic solvent.

5. The method as in claim 1, wherein said operating time is above 3 minutes.

6. The method as in claim 1, wherein the agitation speed of said agitator is 20 rpm.

7. The method as in claim 1, wherein said solution is transferred to a separate evaporator means for separation and recovery of said solvent and the jelly compounds.

* * * * *